Sept. 21, 1965     R. R. ROEMER     3,207,008
HYDRAULIC POWER FEED FOR ROTARY SPINDLE MACHINES
Filed Dec. 26, 1962     6 Sheets-Sheet 1

INVENTOR.
Ralph R. Roemer,
BY John H. Leonard,
his ATTORNEY

Sept. 21, 1965    R. R. ROEMER    3,207,008
HYDRAULIC POWER FEED FOR ROTARY SPINDLE MACHINES
Filed Dec. 26, 1962    6 Sheets-Sheet 2

INVENTOR.
Ralph R. Roemer,
BY John H. Leonard,
his ATTORNEY

Sept. 21, 1965  R. R. ROEMER  3,207,008
HYDRAULIC POWER FEED FOR ROTARY SPINDLE MACHINES
Filed Dec. 26, 1962  6 Sheets-Sheet 3

INVENTOR:
Ralph R. Roemer,
BY John H. Leonard,
his ATTORNEY.

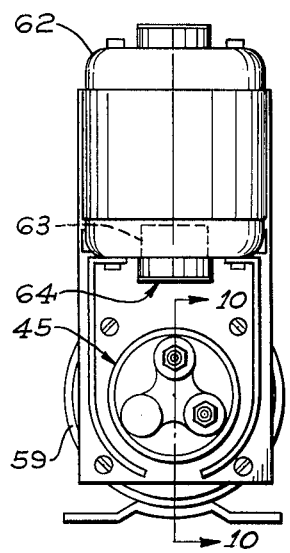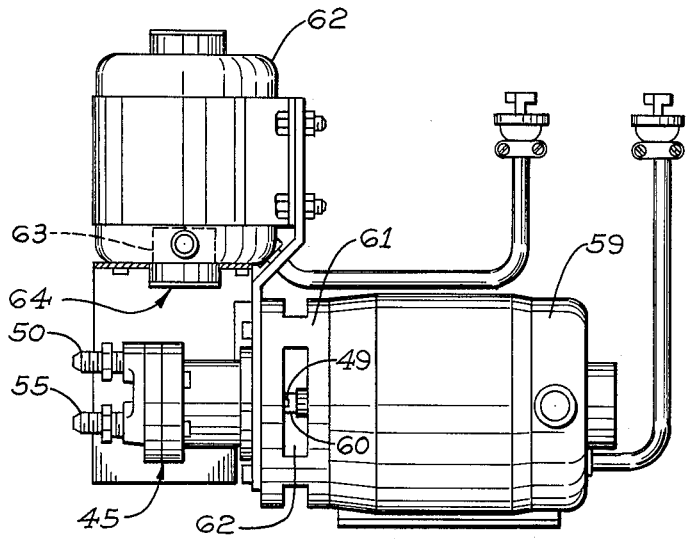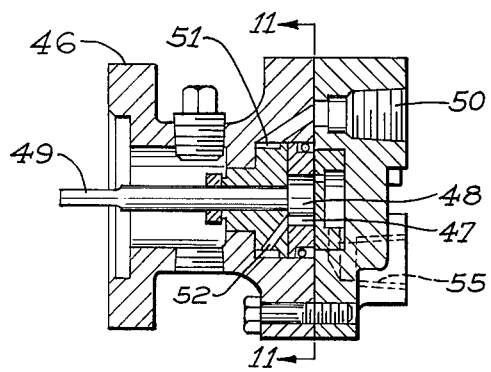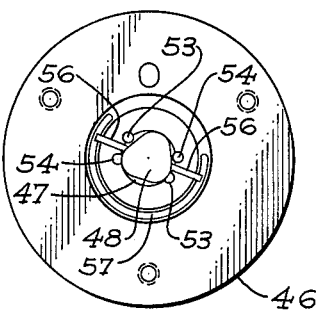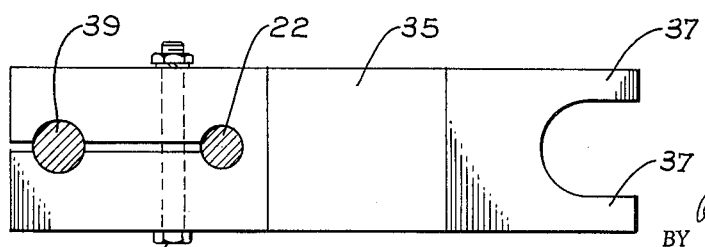

Sept. 21, 1965　　　　R. R. ROEMER　　　　3,207,008
HYDRAULIC POWER FEED FOR ROTARY SPINDLE MACHINES
Filed Dec. 26, 1962　　　　　　　　　　　　6 Sheets-Sheet 6
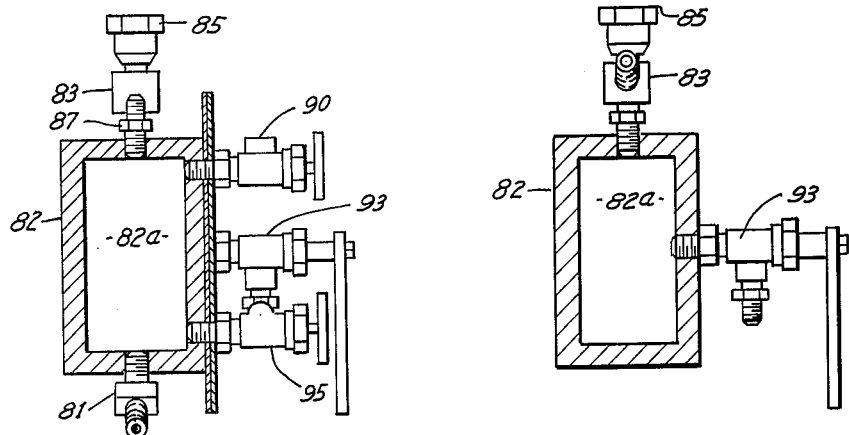
*Fig.12A.*　　　*Fig.12B.*
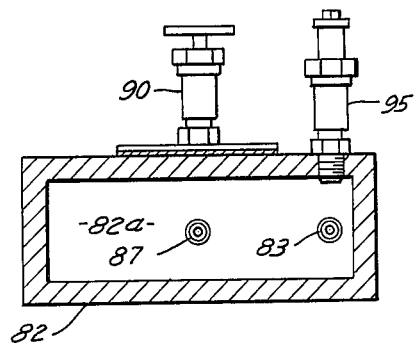
*Fig.12C.*
INVENTOR
Ralph R. Roemer,
BY
his ATTORNEY.

United States Patent Office 3,207,008
Patented Sept. 21, 1965

3,207,008
HYDRAULIC POWER FEED FOR ROTARY
SPINDLE MACHINES
Ralph R. Roemer, 2100 Vega Ave., Cleveland, Ohio
Filed Dec. 26, 1962, Ser. No. 247,129
13 Claims. (Cl. 77—33.5)

This invention relates to a hydraulic power feed for rotary spindle machines, and particularly to a hydraulic power feed for drill presses in connection with which the feed is shown herein for purposes of illustration.

Conventionally, a spindle of a drill press is moved manually on its feed stroke by a rotatable operating lever on the head of the press. The lever is usually connected by a rack and pinion to the spindle quill which is yieldably urged to inactive or returned position by a return spring.

If a large number of like pieces are to be drilled with close tolerances efficiently, a highly skilled operator, capable of judging and maintaining the optimum rate of feed and tool pressure is required. Because of tiring, even a skilled operator finds it difficult to maintain the same rate of feed and constant pressure on the drill against the piece throughout the working day and thereby assure uniform quality.

In order to eliminate the results of this human inadequacy, mechanical feed devices have been provided. The mechanical feed devices have advantages over manual operation, but seldom do they meet optimum conditions. This is because the rates of feed that can be obtained are in fixed stepped relation to each other and always a compromise must be made between the optimum rate of feed and the available rates of feed provided by the various steps. The stepped rate of feed nearest to the optimum rate is selected. Generally, in such stepped relations, the difference between available rates of feed are considerable, unless mechanical feeds disproportionately large and expensive relative to the size of the spindle machines are provided.

Because of these objections, hydraulic feeds have been provided. Prior hydraulic feeds employ a hydraulic piston and cylinder assemblage which, upon admission of pressure fluid to the head end of the cylinder, drives the spindle on its feed stroke. Such hydraulically operated feeds are made disproportionately large for the service they are to perform in order to prevent excessive heating of the hydraulic pump. This has discouraged their acceptance, except for specific uses wherein their desirability is particularly advantageous and cost is a secondary factor.

One of the principal objects of the present invention is to provide a hydraulically operated feed which is small and compact relative to the spindle machine for which it is rated, is accurate in operation in infinitely small increments throughout a wide range of pressures and speeds, and yet is capable of sustained operation over long periods and under heavy loads without excessive heating.

More specifically the present invention is directed to a hydraulic feed circuit for a hydraulic piston and cylinder feed assemblage which, upon extension of the piston by fluid pressure, feeds the spindle on its operating stroke, the pressure feed being characterized in that hydraulic fluid under pressure is supplied by a high speed, high pressure, vane type rotary pump driven by an electric motor; the circuitry is so arranged that, both during operation of the feed and while the feed is idle, it by-passes the supply reservoir and pump, hydraulic fluid discharged by the pump; and the recirculation is in a sufficient volume to reduce the heating effects which would occur were the circuit to the outlet of the pump blocked intermittently, thereby assuring that the pump operates at a relatively low and efficient operating temperature at all times.

Further, in our order to maintain a safe, efficient and relatively low pump temperature, additional power driven cooling means are provided by removing heat from the pump and thus, in combination with the circuitry, maintain the pump within the proper operating range even though its operation is continuous over long sustained periods.

Another object is to vary the pressure and volume of fluid delivered to the cylinder by selectively by-passing back to the reservoir varying amounts of the fluid delivered to the circuit, and further to control the delivery pressure of the pump by driving it at preselected speeds so that the pump operates substantially only at the speed required for the specific work at hand, and is not required to operate at greater speeds and pressures than are essential.

Another object is to control the pump speed by controlling the speed of its driving motor.

Another object is to provide a hydraulic feed in which the pump outlet which is connected to the cylinder for supplying pressure fluid for operating the spindle on the feed stroke is disconnected from the cylinder and the pump inlet instead, is connected to the same end of the cylinder for the return stroke, and thereby draws the pressure fluid from the cylinder and causes a rapid return of the spindle.

The present feed is capable, during a feeding of the spindle against the resistance of the workpiece and the gradually increasing resistance of the return springs of the spindle quill and piston, respectively, of increasing the hydraulic pressure required so as to compensate for the increased spring resistance and thereby maintain a substantially uniform rate of feed throughout the entire feed stroke.

The control also is provided with means which prevent the overload of the hydraulic circuit, feed, machine, and tool.

Specifically, the hydraulic circuit of the feed is one wherein a series of valves is provided by which a continuous flow can be maintained through the pump for cooling the pump during its operation, whether the feed is operable or idle, and wherein a range or limit of selected maximum hydraulic pressure is provided such that the tool is not overloaded and, when the spindle reaches the end of its feed stroke and the spindle stop becomes operative, the stop is not subjected to excessive pressure.

Other objects and advantages of the invention will become apparent from the following description wherein reference is made to the drawings, in which:

FIG. 7 is a top plan view of the quill driving shoe of the present feed;

FIG. 8 is a right side elevation of the motor and pump assemblage used in the present invention;

FIG. 9 is a left end elevation of the structure illustrated in FIG. 8;

FIG. 10 is an enlarged vertical axial sectional view of the pump illustrated in FIG. 9, and is taken on line 10—10 thereof;

FIG. 11 is a vertical cross sectional view of the pump and is taken on line 11—11 of FIG. 10;

FIGS. 12A and 12B are cross sectional views of the manifold, illustrated in FIG. 12, and are taken on lines 12A—12A and 12B—12B thereof, respectively, parts thereof being shown in elevation;

FIG. 12C is a longitudinal sectional view of the manifold illustrated in FIG. 12, and is taken on line 12C—12C of FIG. 12, parts thereof being shown in elevation;

Figure 1:
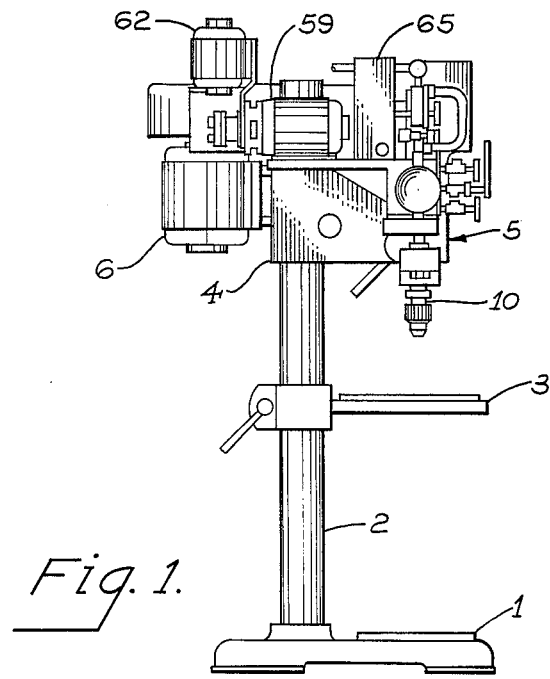
FIG. 1 is a side elevation of a conventional drill press with the feed of the present invention installed thereon.
Figure 2:
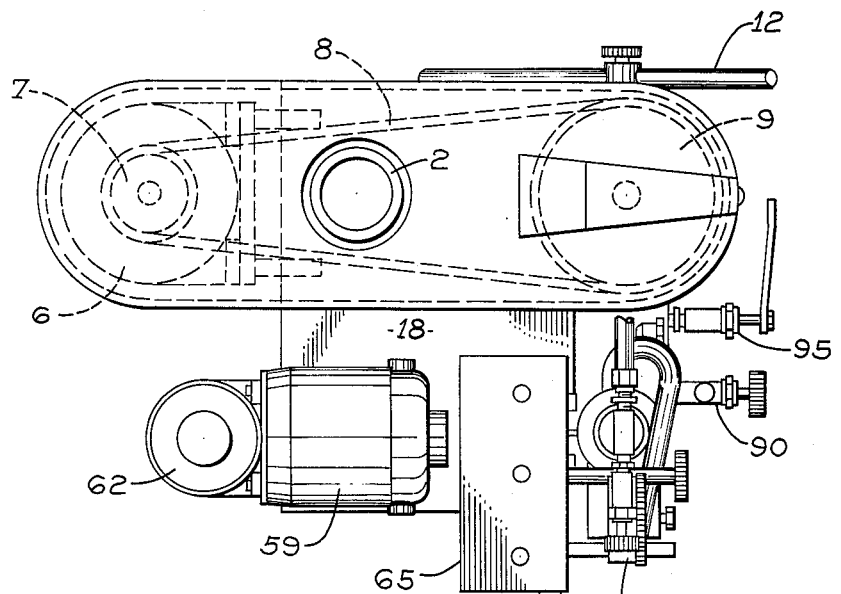
FIG. 2 is an enlarged fragmentary top plan view of the press and feed illustrated in FIG. 1.
Figure 3:
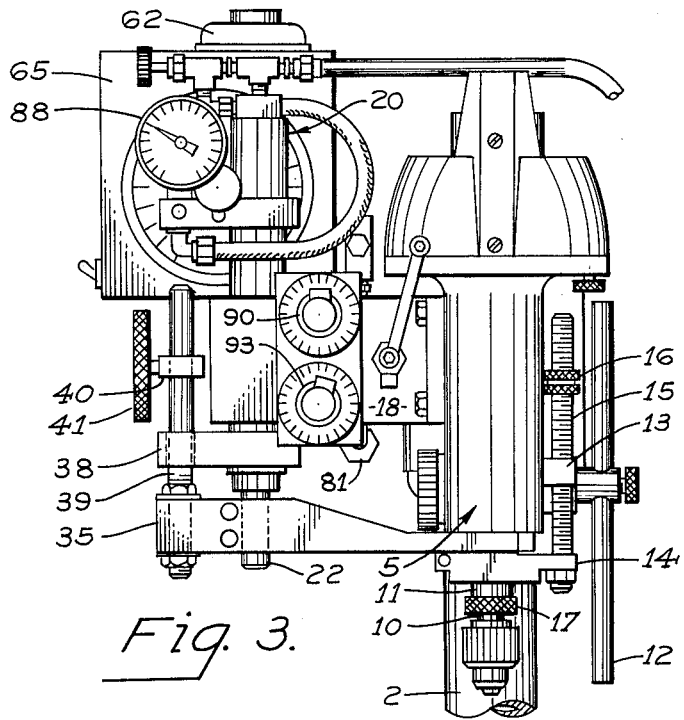
FIG. 3 is an enlarged fragmentary front elevation of the structure illustrated in FIG. 2.
Figure 4:
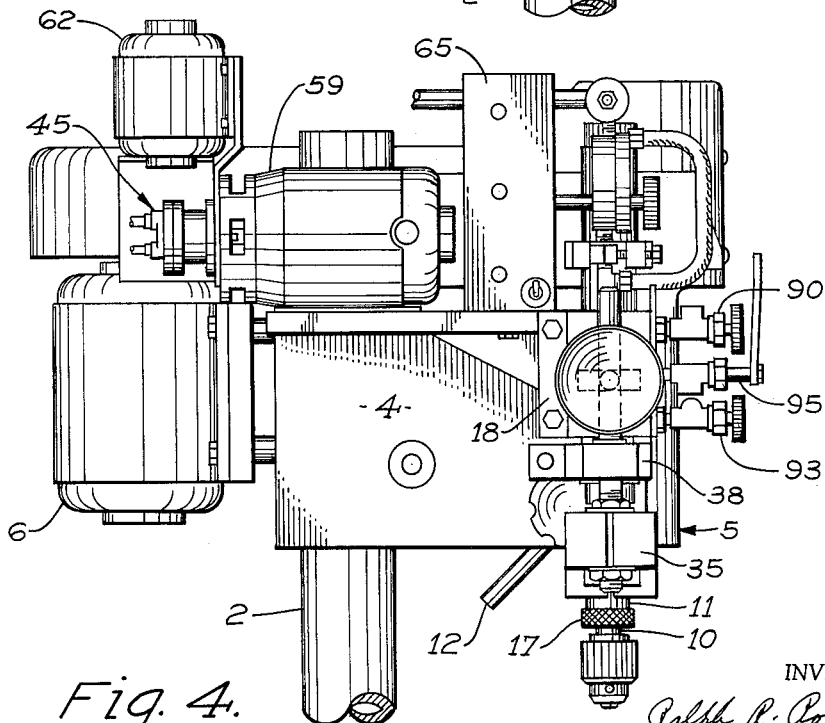
FIG. 4 is an enlarged left side elevation of the structure illustrated in FIGS. 1 and 2.

Referring to the drawings, the invention is shown as applied to the conventional bench type drill press, its use with other types of presses being apparent from the illustrative example.

In the form illustrated, the drill press comprises a base 1 supporting an upright column 2 on which a work table 3 is mounted for vertical adjustment. Mounted on the column 2 above the level of the table 3 is a spindle head and motor supporting bracket 4 which supports a spindle head 5 with its spindle axis upright. The bracket 4 also supports an electric motor 6 which, through the usual cone pulley 7, belt 8, and cone pulley 9, drives the rotary spindle 10 of the press at certain selected speeds.

The spindle 10 is rotatably supported in an axially movable quill or sleeve 11. The quill is supported in the head in the conventional manner for vertical axial movement but is normally manually driven on its feeding stroke by a lever 12. The lever 12 is connected to the quill interiorly of the head 5 by a conventional rack and pinion connection, not shown, and is normally yieldably held in retracted or uppermost position by a suitable return spring, not shown, which returns the head to retracted or starting position from all operating positions when the lever 12 is released.

The press also has the conventional stop 13 in the form of a boss integral with the head 5. A lock collar 14 is clamped on to the quill and supports a threaded rod 15. An adjusting nut 16 is carried on, and is adjustable endwise of, the rod 15 and is cooperable with the stop 13 for limiting the movement of the quill in the direction of feed to a position preselected by adjustment of the nut 16. The spindle also has a lock collar 17 secured thereto.

The structure thus described is a type of drill press readily available on the market and is typical of those generally in use today.

The present invention is arranged to be applied to such a drill press without requiring any change in the structure of the press, so that the press can be operated manually in the usual manner or operated by the control of the present invention, selectively, as desired by the operator.

For supporting the present feed, a lateral bracket arm 18 is connected to the bracket 4.

Figure 5:
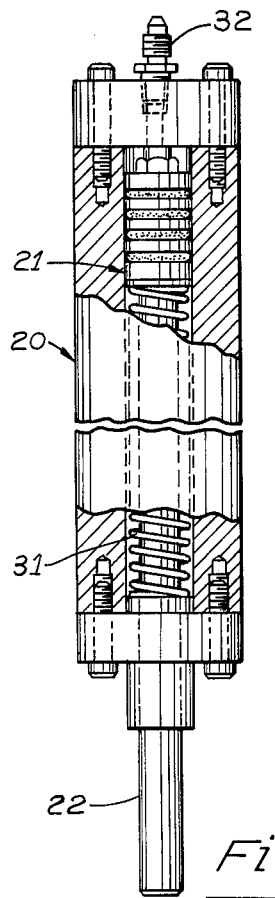
FIG. 5 is an enlarged front elevational view of the piston and cylinder assemblage of the present invention, part thereof being shown in section for clearness in illustration.
Figure 6:
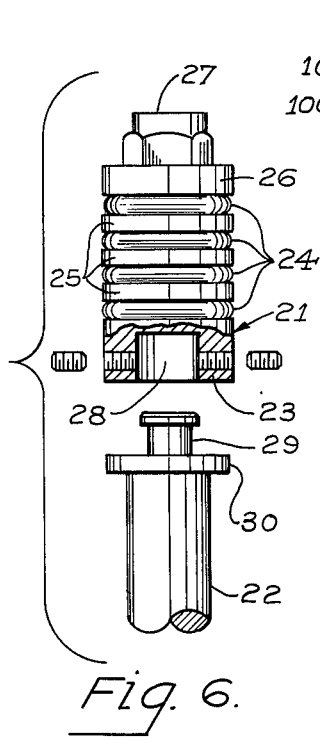
FIG. 6 is an exploded view showing the piston head and a portion of the piston rod, illustrating the manner of their connection.

For moving the quill 11, and therefore the spindle, on the feed stroke by the hydraulic feed of the present invention, a suitable piston and cylinder assemblage is provided. This assemblage comprises a cylinder 20 mounted in fixed axial position on the arm 18 with its axis parallel to the axis of the quill 11. In the cylinder 20 is a piston 21 having a rod 22 which extends out of the lower end of the cylinder. The piston is to withstand very high pressures and must be readily accessible for servicing. As best illustrated in FIGS. 5 and 6, the piston 21 comprises a body 23 having a portion which supports a plurality of O-rings 24 and washers 25 in alternate coaxial relation to each other, the washers and O-rings being held firmly in position by means of an end plate or disc 26 and lock nut 27.

At the end of the body adjacent the piston rod, the body is provided with an axial socket 28. The piston rod 22 has, at the end adjacent the piston, a reduced neck 29 and a flange 30. The neck 29 is adapted to be received in the socket 28 and may be secured therein by suitable radial set screws, as shown, or may be left unsecured axially if desired. A return spring 31 is interposed between the flange 30 and the rod end of the cylinder for returning the rod 22, and thereby the piston 21 to starting position when the pressure in the head end of the cylinder is released. The head end of the cylinder is provided with a conventional nipple 32 for connecting the cylinder into the hydraulic circuit of the feed. The cylinder is closed at both ends by removable plates, as illustrated, for convenience in servicing.

The neck 29 fits the socket 28 with radial clearance so that the piston and rod can align themselves properly axially. By omitting the set screws, the piston can readily be serviced without removing the rod if it is required to change the O-rings at any time.

In order to drive the quill 11, and thereby the spindle 10, on the feed stroke by means of the piston 21, a suitable piston quill shoe 35 is provided. This shoe is clamped firmly onto the piston rod 22, by a suitable clamping screw 36, for movement with the rod. The shoe is provided with yoke arms 37 between which the quill 11 is received.

The yoke arms 37, when in driving relation to the quill collar 14, are juxtaposed in the upper face of the collar 14 and transmit the movement of the piston to the quill through the medium of the collar. Thus, if manual feed is desired for any purpose or for a single piece for example, the press may be operated in the conventional manner by the lever 12, with the power feed idle, and if power feed is required, it may be turned on and used without changing the manual feed.

In order to relieve the adjustable stop 13 and adjustable stop nut 16 from overloading, a stop is provided directly on the shoe 35. In the form illustrated, this stop comprises a collar 38 firmly clamped in fixed axial position on the cylinder 20 near its lower end. A stop rod 39 is secured fixedly in the shoe 35 and extends through suitable passage in the collar 38 in a direction parallel to the axis of the cylinder. An adjustable collar 40 is mounted on the rod 39 for movement axially thereof, and may be clamped in the desired axially adjusted position by means of a knurled head clamping screw 41. Thus, the downward movement of the piston 21 and spindle can be preselected by the adjustment of the collar 40 on the rod 39, the usual stop nut 16 being left at the upper end of the rod 15.

In order to supply pressure fluid to the cylinder 20 a high speed, high pressure, rotary vane type pump is provided. Such a type pump is used instead of gear pumps as the latter must be several times as large for the same delivery. The pump shown for purposes of illustration is one which is available on the market and is sold by The Weldon Tool Company of Cleveland, Ohio. This pump is designed to operate at very high speeds but is extremely compact. As an example of the compactness, the pump shown for purposes of illustration is one having a casing two and one eighth inches in outside diameter. This pump comprises a body 46 having a central cavity 47 in which a three lobe rotor 48 is supported on, and rotatable with a coaxial shaft 49. The pump has an inlet 50 which leads to a suitable internal semiannular reservoir 51. The reservoir 51 is connected by ducts 52 to inlet ports 53 which discharge fluid from the reservoir into the cavity 47. The cavity 47 has outlet ports 54 which lead to the outlet 55 of the pump. Mounted within the cavity for radial movement and bearing at their inner ends against the peripheral surface of the three-lobed rotor are vanes 56. The vanes 56 are urged inwardly into yieldable engagement with the lobes or the periphery of the rotor by means of a clamping or compression ring 57. The rotation of the rotor 48 causes hydraulic fluid to be drawn into the reservoir 51 through the inlet 50 and hence into the cavity 47 between the vanes 56, and to discharge through the ports 54 to the outlet 55.

The pump is driven by a motor 59 of the variable speed type which, for the pump described, may be a ¼ horsepower series wound motor, 115 volt, A.C.-D.C., capable of driving the pump up to 10,000 r.p.m. The motor 59 has a driving shaft 60 which is notched at the outer end to receive a suitable tongue on the driving shaft 49 of the pump rotor.

As heretofore mentioned, the pump is of a very small size and hence for its delivery pressure and speed it has very little heat radiating capacity. Consequently, heating becomes a problem, causing binding and a terrific increase in the frictional drag on the rotor and vanes during operation. In order to reduce the heating of the pump, it is first isolated from heat from the motor. For this purpose, an annular mounting bracket 61 is provided and is mounted on the drive shaft end of the motor casing, and the pump, in turn, is mounted on the bracket and supported thereby and spaced relative to the motor casing. The bracket 61 has a plurality of ventilating openings 62 through which air can circulate readily under the influence of the motor, thus cooling the bracket and reducing the direct conduction of heat from the motor casing to the pump. However, this provision alone is not sufficient to enable the pump to maintain operation at capacity over long periods of time.

Additional cooling means are provided. This cooling means involves by-passing of part of the pump delivery so that a constant recirculation of fluid from the pump to the reservoir and return to the pump is provided. This is supplemented by forced circulation of cooling air onto the pump casing. For this air circulation, an air circulator in the form of a motor 62 with a built-in blower 63 having its air outlet 64 directed onto the casing of the pump is provided. The blower causes air to sweep it continuously over the casing at all times while the pump motor 59 is operating. The motors 59 and 62 may be connected in parallel in a manner to assure that the motor 62 will be energized at all times while the motor 59 is energized. The motor 62 may be a 1/12 horsepower, series wound, A.C.-D.C., motor operating at 7500 r.p.m. at 115 volts.

As hereinbefore mentioned, it is desirable that the pump temperature be maintained at as low an operating level as possible and consequently, in addition to maintaining a blast of cooling air on the pump casing and isolating the pump casing from the direct conduction of heat from the motor, provision is made to drive the pump only at the speed required for the particular job at hand. For this purpose, the motor, as mentioned, is a variable speed series wound motor and its input voltage is under the control of a rheostat 65. The rheostat 65 is operated by a suitable rotatable knob 66 and has a pointer 67 which cooperates with a scale 68 calibrated for direct reading of the pressure which will be delivered by the pump for each setting of the rheostat. Generally the speed of the driving motor 59 is set so that the outlet pressure of the pump is just slightly more than the maximum pressure that is required for the particular job, the slight excess provided being merely an allowance to assure adequate feed despite possible variations in the qualityof the piece of material being machined.

In order to supply hydraulic fluid to the pump, its inlet 50 is connected by a suitable pipe line 69 to a reservoir 70, which may be the conventional gallon can in which the hydraulic fluid is vended. To connect the line 69 to the interior of such a reservoir, a fitting 71 is provided and has a cap portion 71a comparable to the usual cap for the spout of the can. The fitting 71 is provided with a nipple 72 connected to the pipe line 69. A pump supply line 73 extends into the reservoir and has an open end near to the bottom thereof. Mounted on the line 73 near its inlet end is a supporting bracket 74 on which is supported a filter 75 of the usual corrugated porous paper type. The filter has a central passage with which the open end of the pipe 73 communicates. The fitting 71 is provided also with a nipple 76 which discharges through a duct in the fitting directly into the reservoir 70 when the pressure fluid is returned from the hydraulic circuit.

In order to control the delivery of pressure fluid from the outlet 55 of the pump 45 to the head end of the cylinder 20, the outlet 55 is connected by a pipe line 80 to a check valve fitting 81 which is connected to a manifold 82 and permits one way flow of pressure fluid from the outlet 55 into a hollow manifold 82. The manifold 82 has a cavity 82a connected to the inlet fitting 81 and to four valves which are thereby connected at their inlets in parallel with each other by the manifold cavity 82a.

Figure 12:
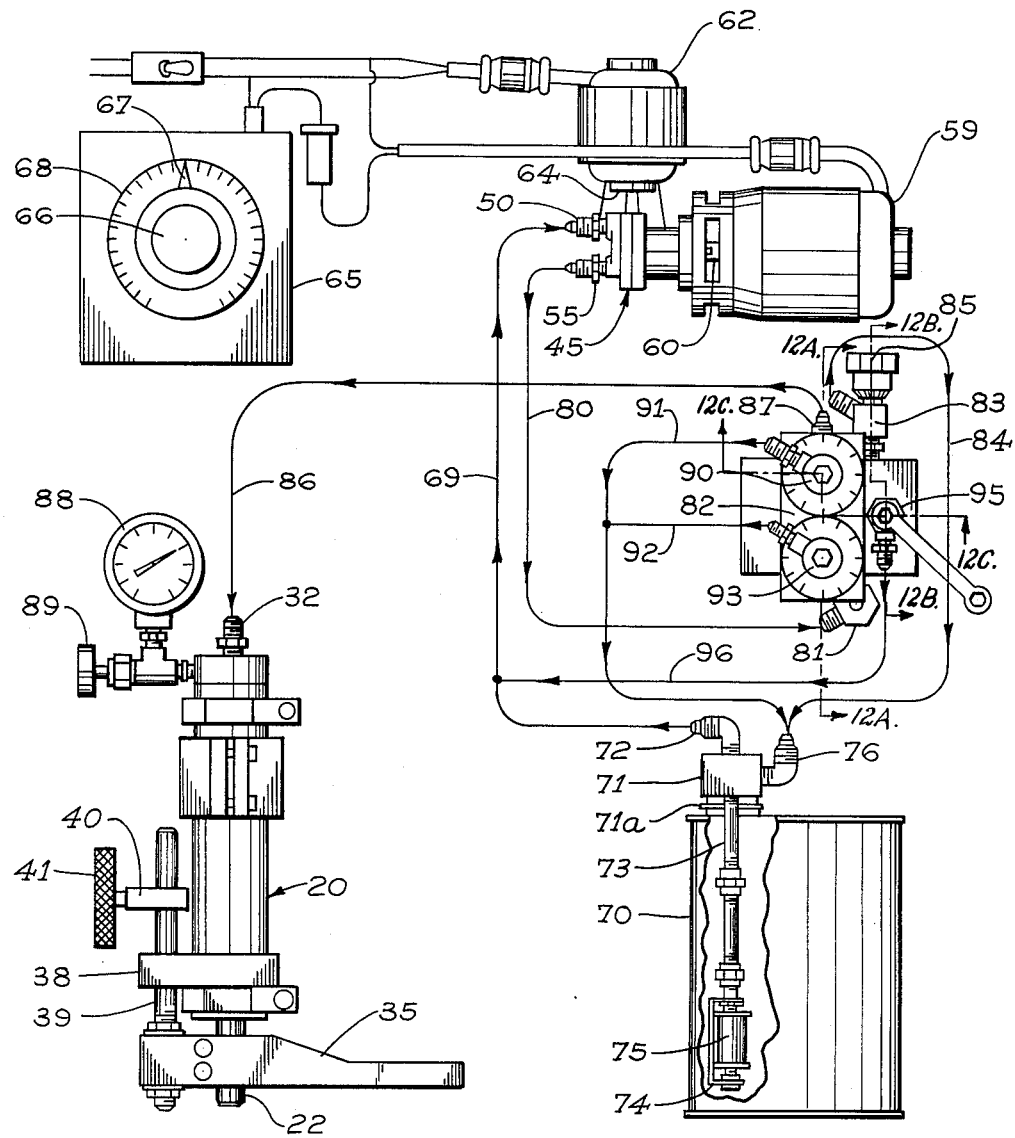
FIG. 12 is a schematic showing of the feed of the present invention, showing the manifold control valves, hydraulic circuit, pump drive and control, and spindle driving piston and cylinder assemblage.

The first valve is a constant flow valve 83 having its inlet connected to the manifold cavity and its outlet connected to a return line 84 which leads into the fitting 76 for discharging return hydraulic fluid into the reservoir 70. The constant flow valve 83 is a needle type valve having the conventional orifice and needle with the needle controlled by a rotary knob 85 which, if desired, may be calibrated, as indicated in FIG. 12, to indicate the amount of flow therethrough. This valve may be arranged, if desired, so that it cannot be entirely closed, but, in any event, during operation of the pump, it is always open to a degree to permit a certain proportion of the pressure fluid delivered into the manifold to return continuously to the reservoir 70 so that whether the hydraulic feed is being operated or not, there will be a continuous recirculation of pressure fluid from the reservoir, through the pump, and back to the reservoir. This not only prevents building up of excessive pressures, but assures cooling in that the radiating capacity of the reservoir itself is thereby added to that of the pump for maintaining the fluid pressure at a lower temperature and preventing the build-up of heat. The reservoir 70 therefore assists in heat exchange for cooling the pump.

Pressure fluid is supplied to the head end of the cylinder 20 through a pipe line 86 and the nipple 32. The pipe line 86 is connected to the manifold cavity 82a by means of a fitting 87. A pressure indicating gauge 88 may be connected to the head end of the cylinder 20 and the flow of fluid into the gauge may be adjusted by a needle valve 89 so as to reduce flutter of the gauge indicating needle.

In order not to overload the adjustable stops or the tool being used in the press, an adjusting valve 90 is provided. The valve 90 has its inlet connected to the manifold cavity and its outlet connected to a pipe line 91 which leads to the fitting 76 and is so connected thereto as to return pressure fluid to the reservoir 70.

As heretofore mentioned, the pressure to be used for a given job usually can be predetermined readily, especially after one or two trial runs, and then the rheostate knob 66 is operated so that the pump delivers pressure just above that desired for the particular job. The valve 90 is a needle valve and it is adjusted so that the pressure to be delivered is the maximum which should be used for the operation and which is not to be exceeded. Assuming the pump is driven to provide a certain pressure in the manifold, and a lower pressure is to be used for feed, the opening of the needle of the valve 90 by-passes part of the fluid back to the reservoir 70 from the manifold, thus reducing the pressure in the manifold cavity and the line 86. The valve 90 is set for the particular operation as also is the valve 85. Thereafter they usually are not adjusted for like work.

Another valve 93 of the needle type has its inlet connected to the manifold cavity and its outlet connected by a pipe line 92 to the pipe line 91 so that the outlet of the valve 93 is also connected to the reservoir 70 and can by-pass fluid thereto. This valve may be adjusted during the feed operation, depending upon the particular rate of feed desired, which usually is determined by observation of the chip by an experienced operator. However, if a number of pieces of like quality are to be made, it may be set for the operation and need not be adjusted during the operation.

In order to initiate and stop the driving of the piston 21 on its feed stroke, an operating valve 95 is provided. This valve has its inlet connected to the manifold cavity and its outlet connected to a pipe line 96 which leads to the pipe line 69 and hence to the inlet of the pump. To initiate the operation of the feed by the piston and cylinder, the valve 95 is closed. Thereupon the pump outlet, being connected to the manifold, causes a build-up of hydraulic pressure in the manifold cavity and cylinder, and starts the piston 21. The valve 93 may be adjusted during the operation of the feed to offset the gradually increasing resistance of the return spring of the piston and quill.

Normally the valve 95 is left open until it is desired to initiate the operation, in which case the piston and quill are in their retracted positions, being yieldably held in those positions by their return springs. With the valve 95 closed, the operation of the piston in its feed stroke continues, the rate of feed and tool pressure depending upon the setting of the valves 83, 90 and 93.

If it is desired to stop the operation, the valve 95 is opened. When this valve is opened it connects the manifold cavity to the line 69 and hence to the inlet of the pump so that the pump, instead of drawing fluid from the reservoir, draws it directly from the manifold. Since the piston 21 is urged by the spring 31 to retracted position, the fluid in the cylinder is normally urged to flow in reverse in the line 86 and can more readily be pumped by the pump than can that from the reservoir at its normal atmospheric pressure. Hence, upon opening the valve 95 and connecting the pump inlet to the manifold cavity, the pump draws the hydraulic fluid from the manifold cavity, and hence from the head end of the cylinder 20, and thus causes rapid return of the piston 21, and hence of the spindle, to fully retracted position. Thus the negative pressure of the fluid and the positive pressure of the spring 31 cooperate for the rapid return which, in the absence of negative pressure in the head end of the cylinder 20, would be sluggish.

In the form illustrated, the feed device is mounted on the arm 18 of the bracket 4 which is bolted to the head 5. However, in some instances, it may be desirable that the feed device be sold to those who already have the drill press, and they may wish to connect to the press without in any way modifying the existing press structure.

Figure 13:
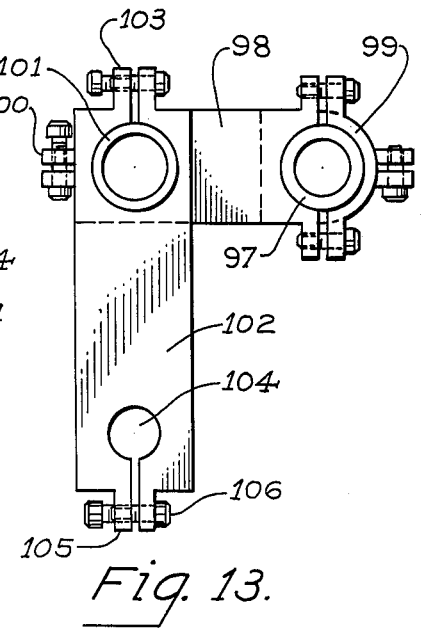
FIG. 13 is a top plan view of a modified form of feed supporting bracket that may be used with the present feed.
Figure 15:
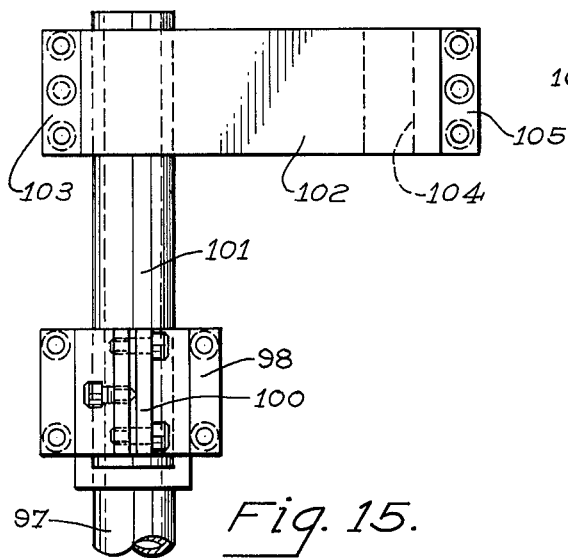
FIG. 15 is a left side elevation of the structure illustrated in FIG. 14.
Figure 14:
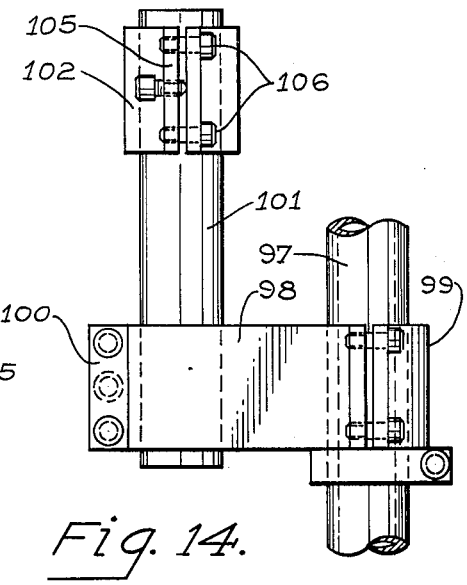
FIG. 14 is a front elevation of the bracket mounting illustrated in FIG. 13.

For this purpose the brackets shown in FIGS. 13–15 are provided. In this form the column, indicated at 97 of the press supports a bracket 98 which is secured to the column 97 by a suitable clamp 99. The bracket 98 has a clamp 100 by which an upright column 101 is secured to the bracket 98. A bracket 102 is fastened by a clamp 103 onto the column 101 in preselected adjusted position thereon. At its outer end, the bracket 102 is provided with a passage 104 in which the cylinder 20 is clamped by a clamp 105 operated by a clamping screw 106. For supporting the rest of the feed structure, the manifold and other parts may be clamped and carried by the cylinder.

The operation of the control is as follows:

Assuming one or two tests have indicated the pressure to be used for a particular job, the motor 59 is started whereupon the pump begins delivering hydraulic fluid. Concurrently therewith the blower motor 62 is started and applies cooling air to the pump casing. The valve 83 is preferably such that it cannot be fully closed so that the pump does not operate against a closed circuit. The rheostat knob 66 is turned so as the rheostat is set for a pump delivery pressure slightly above the maximum that is to be used. This adjusts the speed of the motor 59 and hence drives the pump at the slowest speed consistent with the pressure required. Next, the valve 83 is operated to adjust the amount of fluid by-passed from the outlet of the pump through the manifold to the reservoir 70. Since the motor is a series wound motor, it can adjust itself to the load at whatever speed is selected. At the initiation of operation the position is fully retracted.

Next, the valve 90 is set to the maximum pressure which is to be permitted, so as not to impose too great a load on the quill shoe stops, and tool. This pressure is below that for which the rheostat has been adjusted. Next, the valve 95 is closed whereupon pressure fluid is built up in the manifold and delivered to the cylinder 20 so that the piston starts on the feed stroke. The rate of feed is then controlled by manipulation of the valve 93, the valve being opened to reduce speed and closed down to increase speed. All during this period, some of the fluid is being by-passed from the manifold cavity through the valve 83 and the valve 90.

After one or two pieces have been formed, quite generally the valve 93 can be set so that it does not have to be adjusted thereafter during operations on like pieces, unless some discrepancies in the physical characteristics of the metal or dulling of the tool demand a change.

The piston continues on the feed stroke until the stop collar 40 strikes the collar 38. Thereupon the valve 95 is opened. This immediately disconnects the head end of the cylinder from the pump outlet and connects it to the pump inlet so that the pump draws hydraulic fluid from the head end of the cylinder. The resulting reduced pressure in the head end assists in the return of the piston to starting position. Thereupon the operation can be repeated.

By combining the small high speed, high pressure, vane pump with the present circuitry, greatly increased pump life is obtained, heating is reduced, and power consumption is reduced.

Mounting of the filter on the pipe in the reservoir eliminates expensive filter devices usually required for this operation, and uses only the inexpensive disposable cores instead.

Calibrating indicia, as shown may be provided on the valves to aid in indicating their settings.

The maximum pressure valve, in determining the maximum pressure permitted, acts as a safety feature for protecting the quill, press, workpiece, and pump from overload. The valve 93 acts as a chip quality control. Its needle valve is capable of adjustment to provide infinitely small increments throughout the range from zero to the maximum rate of feed selected for a given job, instead of providing a limited number of stepped rates of feed.

In the feed shown for illustration, the cylinder has an inside diameter 1⅛ inches and is arranged to operate up to 1000 pounds per square inch. The reservoir may be a simple one gallon tin can, and the fluid a conventional type. The filter may be of the porous paper type which is available on the market.

The pump motor is a series wound, quarter horsepower, 115 volt, 60 cycle, A.C.-D.C., motor with a rated speed of 10,000 r.p.m., directly connected to the pump, generally operated at speeds from 4000 to 10,000 r.p.m. to obtain cylinder pressures from 0 to 800 pounds per square inch, at which the pump will operate without much heating. At 9400 r.p.m., it drives the pump to deliver 800 p.s.i. hydraulic pressure. One motor of this character is one available on the market and manufactured by Robbins & Meyers.

The pump is a vane type pump capable of producing the pressures mentioned.

The piston is one employing O-ring seals and the head is detachable for convenience in servicing.

Having thus described my invention, I claim:

1. A hydraulic power feed for a drill press including a spindle head and a spindle reciprocable axially therein, said feed comprising a hydraulic cylinder member, a piston member reciprocable therein, means adapted for securing one member in fixed relation to the head, spindle connecting means connected to the other member and adapted for drivingly connecting the other member to the spindle for moving the spindle axially in the feeding direction when pressure fluid is admitted to one end of the cylinder member, high pressure pump having an inlet and an outlet, an electric motor drivingly connected thereto, a reservoir having an outlet connected to the pump inlet, a hydraulic circuit having a pressure side which connects the pump outlet to said one end of the cylinder member and having, a return side, by-pass valve having an onlet connected to said pressure side and having an outlet connected to the return side and operative to continuously bypass to the return side a substantial part of the hydraulic fluid delivered by the pump to the pressure side of the circuit, an adjustable maximum pressure valve having an inlet connected to said pressure side of the circuit and having an outlet connected to the return side, and operative to by-pass fluid from said pressure side of the circuit back to the return side when the pressure in the pressure side of the circuit exceeds a preselected maximum value, a speed control valve for the piston member and having an inlet connected to said pressure side of the circuit and having an outlet connected to the return side and adjustable for by-passing to the reservoir a preselected proportion of the fluid delivered to the pressure side of the circuit by the pump for controlling the speed of the piston member, and a feed and return valve having its inlet connected to the pressure side of the circircuit and operable when open to discharge pressure fluid from the pressure side of the circuit for permitting return of the piston member, and when closed to prevent said discharge.

2. The structure according to claim 1 wherein the feed and return valve is operative in the open position to connect the pump inlet to said one end of the cylinder member for assisting in said return of the piston member.

3. The structure according to claim 1 wherein said circuit comprises a manifold having a closed cavity connected to the pump outlet and to said one end of the cylinder, and the inlets of all of said valves are connected for communication with said cavity.

4. The structure according to claim 1 wherein a pump support is connected to the pump motor and supports the pump in spaced relation to the pump motor with its power input shaft coaxial with, and connected to, the drive shaft of the pump motor, and said support has passages for permitting circulation of cooling air between the mutually adjacent ends of the pump and the pump motor and in cooling relation to the support.

5. The structure according to claim 1 wherein means are provided for varying the speed of the pump.

6. A hydraulic power feed source for a drill press, including a spindle head and a spindle reciprocable axially therein, said feed comprising a hydraulic cylinder, a piston reciprocable therein, means adapted for securing the cylinder in fixed relation to the head, spindle connecting means connected to the piston and adapted for drivingly connecting the piston to the spindle for moving the spindle axially in the feeding direction when pressure fluid is admitted to the head end of the cylinder, a high pressure pump having an inlet and an outlet, an electric motor drivingly connected thereto, a reservoir having an outlet connected to the pump inlet, a hydraulic circuit including a manifold having a distributing cavity connected to the pump outlet and to the head end of the cylinder, settable valves in said circuit and having their respective inlets connected to the cavity, said valves being operable to start, stop, and control the delivery of pressure fluid to the head end of the cylinder during driving of the pump, and a by-pass circuit connecting the cavity and reservoir for by-passing to the reservoir continuously during pump operation a part of the pressure fluid discharged by the pump.

7. A hydraulic feed device for a drill press having a spindle, said feed device comprising, a piston and cylinder assemblage, means driven by the assemblage and adapted to be drivingly connected to the spindle of a drill press for moving the spindle on its feed stroke in fixed relation to the operation of the piston and cylinder assemblage, a reservoir for hydraulic fluid, a high pressure pump, an electric motor drivingly connected to the pump, a hydraulic circuit including a pressure side and a return side and connecting the pump inlet to the reservoir and the pump outlet to one end of the cylinder of the assemblage for supplying hydraulic fluid under operating pressure to the assemblage, settable control valve means, having inlet means connected to the pressure side of said circuit and having outlet means connected to the return side of the circuit, to start, stop, and vary the delivery of operating pressure fluid to the assemblage during driving of the pump, and a by-pass circuit connecting the pump outlet and reservoir and being operable for by-passing fluid from said pressure side of the circuit to the reservoir continuously during the driving of the pump and the maintenance of the pressure fluid in the assemblage at operating pressure.

8. A hydraulic power feed for a drill press which includes a spindle head and a spindle reciprocable axially therein,
  said feed comprising a hydraulic cylinder member, a piston member reciprocable therein,
  means respective to the members and adapted to connect one member to the head and the other member to the spindle for moving the spindle axially in the feeding direction when pressure is admitted to one end of the cylinder member,
  a high pressure pump having an inlet and an outlet and operable to supply pressure fluid at predetermined pressure above a predetermined minimum operating pressure,
  an electric motor drivingly connected to the pump,
  a hydraulic circuit having a pressure side connected to the pump outlet and to said one end of the cylinder and having a return side connected to the pump inlet,
  a normally open valve interconnecting the pressure side of the circuit and return side of the circuit and having flow capacity in its normally open position to bypass pressure fluid from the pressure side to the return side in sufficient quantity to reduce the pressure in the pressure side below said minimum operating pressure, and when in a position out of its normally open position to prevent the flow of pressure fluid from the pressure side to the return side to a degree sufficient to cause the pressure in the pressure side to reach an operating pressure exceeding said minimum operating pressure, and settable valve means interconnecting the pressure side and the return side and operative, when in selected set positions, to control the flow of pressure fluid from the pressure side to the return side in selected volumes, respectively, thereby to maintain the operating pressure in the pressure side, when the normally open valve is in a position out of its normally open position, at preselected pressures, respectively, above said minimum pressure and below said predetermined pressure, and to maintain the rate of admission of pressure fluid to said one end of the cylinder.

9. The structure according to claim 8 wherein said settable valve means is a normally open valve.

10. The structure according to claim 8 wherein said settable valve means is connected in the circuit in parallel with the normally open valve.

11. The structure according to claim 8 wherein a maximum pressure control valve connects the pressure side and return side, said maximum pressure control valve is a normally open valve and is operable to bypass pressure fluid continuously from the pressure side to the return side in amounts sufficient to limit the maximum operating pressure in the pressure side.

12. The structure according to claim 8 wherein a pressure gauge is connected to the pressure side of the circuit.

13. The structure according to claim 8 wherein spring return means are provided for returning the piston to starting position when the pressure in said one end of the cylinder member is discontinued.

References Cited by the Examiner

UNITED STATES PATENTS

| | | | |
|---|---|---|---|
| 1,582,468 | 4/26 | Heald et al. | 60—52 |
| 1,990,052 | 2/35 | Sosa | 77—33.5 X |
| 2,125,641 | 8/38 | McKee et al. | 77—33.5 |
| 2,352,206 | 6/44 | Kendall | 82—900 |
| 2,469,936 | 5/49 | Tabbert | 230—211 X |

WILLIAM W. DYER, Jr., *Primary Examiner.*

J. SPENCER OVERHOLSER, *Examiner.*

UNITED STATES PATENT OFFICE
CERTIFICATE OF CORRECTION

Patent No. 3,207,008

September 21, 196

Ralph R. Roemer

It is hereby certified that error appears in the above numbered patent requiring correction and that the said Letters Patent should read as corrected below.

Column 2, line 5, for "by" read -- for --; column 6, line 67, for "rheostate" read -- reheostat --; column 7, lines 57 and 60, strike out "device", each occurrence; column 8, line 18, for "position" read -- piston --; column 9, line 24, for "onlet" read -- inlet --.

Signed and sealed this 19th day of April 1966.

(SEAL)
Attest:

ERNEST W. SWIDER
Attesting Officer

EDWARD J. BRENNER
Commissioner of Patents